(12) United States Patent
Ibaragi et al.

(10) Patent No.: US 9,719,185 B2
(45) Date of Patent: Aug. 1, 2017

(54) RESIN-COATED STAINLESS STEEL FOIL, CONTAINER AND SECONDARY BATTERY

(75) Inventors: Masaharu Ibaragi, Futtsu (JP); Hiroshi Kajiro, Futtsu (JP); Hiroshi Ohishi, Futtsu (JP)

(73) Assignee: NIPPON STEEL & SUMIKIN MATERIALS CO., LTD., Tokyo (JP)

( * ) Notice: Subject to any disclaimer, the term of this patent is extended or adjusted under 35 U.S.C. 154(b) by 1589 days.

(21) Appl. No.: 12/086,830

(22) PCT Filed: Jul. 28, 2006

(86) PCT No.: PCT/JP2006/315434
§ 371 (c)(1),
(2), (4) Date: Jun. 19, 2008

(87) PCT Pub. No.: WO2007/072604
PCT Pub. Date: Jun. 28, 2007

(65) Prior Publication Data
US 2009/0029245 A1    Jan. 29, 2009

(30) Foreign Application Priority Data

Dec. 20, 2005  (JP) ................................. 2005-366763

(51) Int. Cl.
*H01M 2/02*    (2006.01)
*C25D 11/38*   (2006.01)
(Continued)

(52) U.S. Cl.
CPC .............. *C25D 11/38* (2013.01); *B32B 15/08* (2013.01); *B32B 15/18* (2013.01); *C25D 5/56* (2013.01);
(Continued)

(58) Field of Classification Search
CPC ........... B32B 15/08; B32B 15/18; C25D 5/56; C25D 11/38; H01M 2/0275;
(Continued)

(56) References Cited

U.S. PATENT DOCUMENTS 4,411,964 A  *  10/1983  Hara et al. .................... 428/626
5,804,654 A  *  9/1998   Lo et al. ......................... 525/67
2004/0067376 A1   4/2004  Arao et al.

FOREIGN PATENT DOCUMENTS

CN     1491443      4/2004
EP     1359631      11/2003
(Continued)

OTHER PUBLICATIONS

English Machine Translation of Japanese Patent Application Publication 2000-357494, obtained from JPO on Jul. 5, 2011.*

(Continued)

*Primary Examiner* — Nicholas Kokkinos
(74) *Attorney, Agent, or Firm* — Birch, Stewart, Kolasch & Birch, LLP

(57) ABSTRACT

The present invention provides a resin-coated stainless steel foil capable of maintaining a strong adherence force to the film even in an electrolytic solution to exhibit good corrosion resistance and excellent in the workability, design property and piecing resistance, and a container and a secondary battery each using the resin-coated stainless steel foil. A resin-coated stainless steel foil having a chromate treatment layer of 2 to 200 nm in thickness on at least one surface of a stainless steel foil and having at least a polyolefin-based resin (A) layer containing a functional group having polarity on the chromate treatment layer; and a container and a secondary battery each using the resin-coated stainless steel foil are also provided.

17 Claims, 3 Drawing Sheets

(51) Int. Cl.
- *B32B 15/08* (2006.01)
- *B32B 15/18* (2006.01)
- *C25D 5/56* (2006.01)
- *H01M 10/052* (2010.01)
- *H01M 10/0585* (2010.01)
- *H01M 10/0587* (2010.01)
- *H01M 10/24* (2006.01)

(52) U.S. Cl.
CPC ....... *H01M 2/0275* (2013.01); *H01M 2/0277* (2013.01); *H01M 2/0285* (2013.01); *H01M 2/0207* (2013.01); *H01M 2/0287* (2013.01); *H01M 2/0295* (2013.01); *H01M 10/052* (2013.01); *H01M 10/0585* (2013.01); *H01M 10/0587* (2013.01); *H01M 10/24* (2013.01); *Y10T 428/13* (2015.01); *Y10T 428/265* (2015.01)

(58) Field of Classification Search
CPC ............ H01M 2/0277; H01M 2/0285; H01M 2/0207; H01M 2/0287; H01M 2/0295; H01M 10/052; H01M 10/0585; H01M 10/0587; H01M 10/24; Y02T 10/7011
USPC ........... 429/163–187; 423/595; 428/327, 458
See application file for complete search history.

(56) References Cited

FOREIGN PATENT DOCUMENTS

| JP | 61-237634 | 10/1986 |
|---|---|---|
| JP | 7-090690 | 4/1995 |
| JP | 9-268398 | 10/1997 |
| JP | 2000-357494 | 12/2000 |
| JP | 2001-347602 | 12/2001 |
| JP | 2004-52100 | 2/2004 |
| JP | 2005-297448 | 10/2005 |

OTHER PUBLICATIONS

English Machine Translation of Japanese Patent Application Publication H07-090690, obtained from JPO on Jul. 5, 2011.*
Engelhard, Mark, "Electron Spectrometer: Scanning XPS Microprobe, High Resolution (Quantera)", Obtained Dec. 28, 2011, United States Department of Energy, http://www.emsl.pnl.gov/capabilities/viewInstrument.jsp?id=1023.*
Taiwanese Office Action in corresponding Taiwan Patent Application No. 095127988 dated May 11, 2010.
Usuki, A., et al., "Polymer-Clay Nanocomposites," *Inorganic Polymeric Nanocomposites and Membranes*, vol. 179, Jun. 2005, pp. 135-195.
International Search Report dated Oct. 17, 2006 issued in corresponding PCT Application No. PCT/JP2006/315434.
Taiwanese Office Action in corresponding Taiwan Patent Application No. 095127988 dated May 11, 2010 (translated).
European Search Report dated Jul. 27, 2011 issued in corresponding European Application No. 06 78 2294.
Database WPI Week 198649 Thomson Scientific, London, GB; AN 1986-321906 XP000002651581.
Chinese Office Action dated Aug. 9, 2011 issued in corresponding CN Application No. 200680047697.1.
*Practical Surface Analysis by Auger and X-ray Photoelectron Spectroscopy*, 142-143, 176-177 (Briggs and Seah, eds., John Wiley & Sons, 1983).
Yu et al., *A study of the composition and structure of chromate conversion coating on aluminum*, Applied Surface Science 62, 217-221 (1992).
Long et al., *Characterization of black chromate conversion coating on the electrodeposited zinc-iron alloy*, Applied Surface Science 218, 123-136 (2003).

* cited by examiner

RESIN-COATED STAINLESS STEEL FOIL, CONTAINER AND SECONDARY BATTERY

TECHNICAL FIELD

The present invention relates to a resin-coated stainless steel foil, a container and a secondary battery, which are excellent in corrosion resistance, workability, design property and piercing resistance.

BACKGROUND ART

A secondary battery such as a nickel-cadmium battery, nickel-hydrogen battery and lithium ion battery is widely used in electronic devices or components, particularly in cellular phones, notebook personal computers, video cameras, satellites and electric or hybrid cars. Conventionally, in the case of a secondary battery using a strong alkali electrolyte, such as nickel-cadmium and nickel-hydrogen, a casing composed of a nickel-plated cold-rolled steel sheet or a plastic casing has been used. In a battery using a non-aqueous electrolyte, such as a lithium ion battery, the electrolyte incorporated into an aluminum pouch is wrapped with a plastic casing or a casing composed of a nickel-plated steel sheet or stainless steel sheet.

In recent years, with the miniaturization of electronic and electric components, a secondary battery is also required to be compact and lightweight. In such a trend, thinning of a secondary battery container is attracting attention as a tool allowing for mounting of a larger amount of electrolyte or ion in a limited volume and thereby enabling an increase in battery capacity. However, if the strength of the container is decreased due to thinning, a risk of liquid leakage of the electrolytic solution due to deformation or breakage when an outer force or piercing is applied. The liquid leakage of the electrolytic solution has a high possibility of causing serious damage to the apparatus where the secondary battery is incorporated. If the container member is plastic or aluminum, strength is insufficient with a wall thickness of 200 µm or less. For realizing more thinning, a material having high strength is necessary. Considering mass production, the material is preferably a general-purpose material.

The material satisfying such required properties includes a stainless steel foil. Stainless steel foil is a foil obtained by thinning a stainless steel to a thickness of 200 µm or less. Stainless steel generally has high strength such that the tensile strength or Vickers hardness is 2 to 10 times that of plastic or aluminum, and is promising as a thinned material for the secondary battery container.

However, the metal foil has poor corrosion resistance in an electrolytic solution and when used for a battery casing or a lead wire, is sometimes eroded by the electrolytic solution. As a countermeasure to make up for the weakness in corrosion resistance of the metal foil, a metal foil comprising a chromate-treated aluminum foil having stacked thereon an acid-modified polyolefin film having barrier property against a corrosion-causing substance is disclosed (see, for example, Japanese Unexamined Patent-Publication (Kokai) No. 2000-357494). By this technique, the workability or corrosion resistance can be improved to a certain extent. However, the film sometimes fails to exert sufficiently high adherence when the thickness of the chromate treatment layer is inadequate. Also, if the chromate treatment layer is thicker than necessary, this is disadvantageous in that a chromate having a large environmental load is uselessly used. In particular, a stainless steel foil has a problem that adherence between the chromate treatment layer and the stainless steel of the base material is weak, and, for example, the chromate treatment layer comes off from the base material to cause separation of the film.

A stainless steel foil obtained by drawing a stainless steel to a thickness of 200 µm or less is attracting attention as a material having a thin wall thickness and excellent mechanical strength and is being widely applied as a material for home electric components such as refrigerator or heat-insulated pouch, OA equipment components such as arm, load beam, flexure and cover of a hard disc drive, or lead wires or pouches of a secondary battery. However, stainless steel foil generally has a problem in workability, and a technique or the like for optimizing the composition and heat treatment to improve the workability is known (see, for example, Japanese Unexamined Patent Publication (Kokai) No. 2004-52100). A lubricant is necessary at the shaping such as drawing in many cases, and three steps of degreasing, coating of lubricating oil and removal of lubricating oil are required before and after the working. These steps not only lead to an increase in the step at the shaping but also sometimes require a separation step of separating cleaning water and lubricating oil. Even when a lubricant is used, there is a case where the mold cannot be satisfactorily prevented from abrasion and the mold life cannot be sufficiently prolonged.

Furthermore, as described above, a secondary battery has many uses in a mobile product, and since the battery of a mobile product can be replaced by an individual user, the need for good design property is high. However, it is technically cumbersome and involves a relatively high cost to clearly print letters directly on a stainless steel foil by printing or provide color variations. Thus, a high design property is difficult to impart to the stainless steel foil.

The present invention has been made by taking into consideration these problems and an object of the present invention is to provide a stainless steel foil capable of maintaining strong adherence to a film even in an electrolytic solution to exhibit good corrosion resistance and excellent in workability, design property and piecing resistance, a container using the stainless steel foil, and a secondary battery using the container.

DISCLOSURE OF THE INVENTION

The present inventors have made an analysis in detail on how a stainless steel foil subjected to a chromate treatment of coating a polyolefin-based resin composition containing a functional group having polarity, such as acid-modified polyolefin film, causes separation in an electrolytic solution, as a result, it has been found that when the chromate treatment layer is too thin, a strong adherence force to the resin composition cannot be brought out, whereas when the layer is too thick, a defect such as cracking and fall-off is generated in the plating treatment layer at the working. The present invention has been accomplished based on this finding. More specifically, the present invention is a technique achieved by taking notice of the fact that both the adherence force between a chromate treatment layer and a polyolefin film containing a functional group having polarity and the quality of the chromate treatment layer itself are correlated to the thickness of the chromate treatment layer, and this technique realizes an optimal range of the thickness of the chromate treatment layer satisfying both the practically necessary and sufficient adherence force with a polyolefin film containing a functional group having polarity and the practically indispensable workability and enables industrial production by an existing apparatus without difficulty.

In this technique, an appropriate surface preparation treatment such as nickel strike plating is performed and the chromate treatment layer is thereby allowed to more strongly adhere to the stainless steel foil, so that the corrosion resistance can be more enhanced and stable production in actual operation can be ensured.

In this way, the gist of the present invention resides in a stainless steel foil where the thickness of the chromate treatment layer is controlled to an appropriate range, an appropriate surface preparation treatment such as nickel strike plating is preferably applied, and a film of an appropriate resin composition is coated on one surface or both surfaces.

That is, the gist of the present invention is as follows.

(1) A resin-coated stainless steel foil having a chromate treatment layer of 2 to 200 nm in thickness on at least one surface of a stainless steel foil and having at least a polyolefin-based resin (A) layer containing a functional group having polarity on the chromate treatment layer.

(2) The resin-coated stainless steel foil as described in (1), having a chromate treatment layer of 2 to 200 nm on one surface of the stainless steel foil, having at least a polyolefin-based resin (A) layer containing a functional group having polarity on the chromate treatment layer, and having a resin layer on the other surface of the stainless steel foil.

(3) The resin-coated stainless steel foil as described in (1) or (2), wherein the chromate treatment layer has a thickness of 5 to 60 nm.

(4) The resin-coated stainless steel foil as described in (1) or (2), wherein the chromate treatment layer has a thickness of 8 to 40 nm.

(5) The resin-coated stainless steel foil as described in any one of (1) to (4), wherein the functional group having polarity in the polyolefin-based resin (A) is at least one member selected from the group consisting of an acid anhydride group, a hydroxyl group, a carboxyl group, an amide group, an amino group, a urethane group, an ester group, an imide group, a maleimide group, a chlorine group, a bromine group, an ether group, a thiol group, an epoxy group, a nitrile group and $-SO_3-$.

(6) The resin-coated stainless steel foil as described in any one of (1) to (5), wherein the content of the functional group having polarity in the polyolefin-based rein (A) is from 0.0005 to 5 mmol/g.

(7) The resin-coated stainless steel foil as described in any one of (1) to (6), wherein from 0.01 to 50 mass % of a layered inorganic material (B) is dispersed in the polyolefin-based resin (A).

(8) The resin-coated stainless steel foil as described in (7), wherein the longest diameter of the layered inorganic material (B) is 1 μm or less.

(9) The resin-coated stainless steel foil as described in (7) or (8), wherein the layered inorganic material (B) is montmorillonite.

(10) The resin-coated stainless steel foil as described in any one of (1) to (9), which has a strike plating layer between the chromate treatment layer and the stainless steel foil.

(11) The resin-coated stainless steel foil as described in (10), wherein the plating species of the strike plating is nickel.

(12) The resin-coated stainless steel foil as described in any one of (1) to (11), wherein the stainless steel foil has a thickness of 10 to 200 μm and the polyolefin-based resin (A) layer has a thickness of 0.5 to 200 μm.

(13) The resin-coated stainless steel foil as described in any one of (2) to (12), wherein the resin layer on the other surface of the stainless steel foil is at least one resin layer composed of a resin composition comprising, as the main component, one member or two or more members selected from the group consisting of a polyolefin, a polyester, a polyamide and a polyimide.

(14) The resin-coated stainless steel foil as described in any one of (2) to (13), wherein the resin layer on the other surface of the stainless steel foil is at least one resin layer composed of a polyester-based resin (E) having finely dispersed therein a rubbery elastomer resin (D) capsulated with a vinyl polymer (C) containing a polar group.

(15) The resin-coated stainless steel foil as described in any one of (2) to (14), which has a surface preparation treatment layer between the resin layer on the other surface of the stainless steel foil and the stainless steel foil.

(16) The resin-coated stainless steel foil as described in (15), wherein the surface preparation treatment layer is one layer or two or more layers selected from the group consisting of a chromate treatment layer, a chemical conversion layer and an adhesive layer.

(17) A container obtained by shape-forming the resin-coated stainless steel foil described in any one of (1) to (16).

(18) A secondary battery using the container described in (17).

According to the present invention, a stainless steel foil capable of maintaining strong adherence force to a film even in an electrolytic solution to exhibit good corrosion resistance and excellent in the workability, design property and piecing resistance, a container using the stainless steel foil, and a secondary battery using the container can be provided.

BRIEF DESCRIPTION OF THE DRAWINGS

FIG. 4 is a perspective view schematically showing the construction of the lithium secondary battery, FIG. 5 is a laterally viewed cross section along the A-A line of FIG. 4, and FIG. 6 is a laterally viewed cross section along the B-B line of FIG. 4.

BEST MODE FOR CARRYING OUT THE INVENTION

Figure 1:
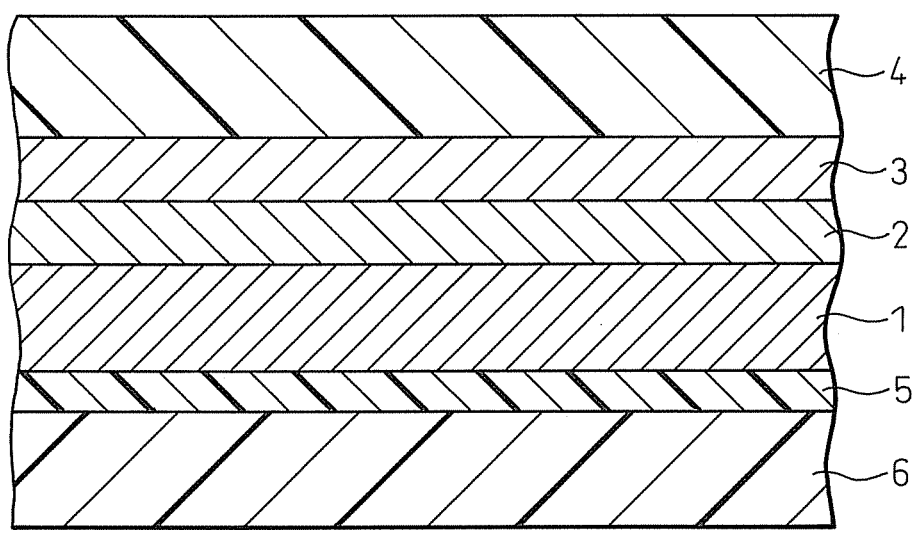
FIG. 1 is a cross-sectional schematic view showing one example of the resin-coated stainless steel foil of the present invention.

Preferred embodiments of the present invention are described in detail below by referring to the drawings attached.

In FIG. 1, a nickel strike plating layer 2, a chromate treatment layer 3 and a polyolefin-based resin layer 4 are sequentially formed on one main surface of a stainless steel foil 1, and a resin layer 6 is formed through an adhesive layer 5 on another main surface of the stainless steel foil 1. In the resin-coated stainless steel foil of the present invention, a chromate treatment layer 3 and a polyolefin-based resin layer 4 must be formed on one surface of the stainless steel foil 1, but the nickel strike plating layer 2, adhesive layer 5 and resin layer 6 are an arbitrary layer.

The stainless steel for use in the present invention may be any of austenite type (e.g., SUS301, 304, 316L), ferrite type (e.g., SUS430) and martensite type (e.g., SUS410), and heat treatment and rolling may be freely applied thereto. The thickness of the foil is preferably from 10 to 200 μm.

In the present invention, a chromate treatment coat is provided on one surface or both surfaces of the stainless steel foil. The chromate treatment coat is formed by a conventionally known chromate treatment, but the thickness of the chromate coat is controlled to be from 2 to 200 nm, preferably from 5 to 60 nm, more preferably from 8 to 40 nm.

In general, the chromate treatment is quantified by the mass (e.g., mg/m$^2$) of the treatment coat per unit area or the quantity of electricity (C/dm$^2$) passed per electrolytic chromate treating time, where, however, the thickness of the coat is not specified. In a general continuous chromate treatment line, the inlet or outlet of a plating bath for the introduction or removal of a stainless steel foil is sealed with a sealing member and when the treated stainless steel foil passes through the seal part, this may cause non-uniformity in the thickness of the unstable chromate treatment coat shortly after the treatment. Accordingly, the chromate treatment layer should not be controlled by the presumption from the mass (e.g., mg/m$^2$) of the treatment coat per unit area or the quantity of electricity (C/dm$^2$) passed per treating time, but the chromate treatment layer needs to be controlled by the actual coat thickness.

In the case where the thickness of the coat is uniform and less than 2 nm, where the thickness is non-uniform and partially less than 2 nm, or where pinholes are present, the adherence force between the polyolefin film and the stainless steel foil in an electrolytic solution is sometimes insufficient, giving rise to separation. Also, if the thickness exceeds 200 nm, cracking may occur in the treatment layer when working the stainless steel foil or the adherence force between the polyolefin film and the stainless steel foil in an electrolytic solution may be insufficient, giving rise to separation. Furthermore, if the chromate treatment layer is thicker than necessary, this is disadvantageous in that chromate having a large environmental load is uselessly used.

In the present invention, the thickness of the coat is measured by examining how the elements are present by XPS analysis (X-ray photoelectric spectroscopy), and the depth from the surface layer until an Fe element is detected is defined as the thickness of the chromate treatment coat. In the case where a resin coat is present on the surface, the surface is obliquely cut by a sharp cutting tool, and the cross section is analyzed by XPS.

Specific examples of the chromate treatment method include a method of coating an aqueous solution comprising chromium oxide as the main component or an aqueous solution comprising chromium oxide and phosphoric acid as the main component, and a method of performing an electrolytic chromate treatment. Other examples include, as the conventionally known chromate treatment method, a method of coating an aqueous solution comprising chromium oxide and polyacrylic acid as the main component, and heating and drying the coating, but the present invention is not limited thereto.

The surface to which the chromate treatment is applied is preferably subjected to a surface preparation treatment. Above all, a strike plating treatment is preferred, and a nickel strike plating treatment is more preferred. Examples of the strike plating treatment include, but are not limited to, nickel strike plating, gold strike plating, gold alloy strike plating, palladium strike plating, copper strike plating and silver strike plating. Out of these, in the nickel strike plating, nickel plating is deposited on the stainless steel surface while removing the oxide coat on the stainless steel foil surface. By virtue of no intervention of an oxide coat between stainless steel and nickel plating, strong nickel plating is obtained. The nickel plating has strong adherence force to the chromate treatment layer and therefore, a firm chromate treatment layer can be formed on the stainless steel foil by applying nickel strike plating treatment as the surface preparation treatment. The chromate treatment applied directly on the stainless steel foil brings about the possibility of easily causing separation of the coat, because the coat before drying the treating solution is unstable. Accordingly, in order to stably produce the stainless steel foil in industry, for example, severe control of the drying step is required and this is cumbersome. However, by applying a surface preparation treatment of nickel strike plating to the stainless steel foil surface, a strong chromate treatment layer causing neither easy separation nor deterioration even in an electrolytic solution can be formed, as a result, stable industrial production capable of controlling the thickness of the chromate treatment layer is enabled. For the strike plating treatment, a conventionally known method can be employed.

Specific examples of the method for the nickel strike plating treatment include, but are not limited to, a method where a total chloride nickel strike plating bath containing an aqueous solution comprising nickel chloride and hydrochloric acid as the main component is used and electricity is passed for 1 to 600 seconds at a cathode current density of 0.1 to 15 A/dm$^2$. The nickel strike plating is sufficient if it is applied to the entire surface or a part of the surface, and the practical plated amount is not particularly specified, but plating to a thickness of 0.1 nm to 5 μm is preferred.

The polyolefin-based resin (A) containing a functional group having polarity for use in the present invention is a resin which comprises, as the main component, a resin having a repeating unit represented by the following (formula 1) and contains a functional group having polarity. The "main component" indicates that the resin having a repeating unit of (formula 1) constitutes 50 mass % or more.

$$—CR^1H—CR^2R^3— \qquad \text{(formula 1)}$$

(wherein R$^1$ and R$^2$ each independently represents an alkyl group having a carbon number of 1 to 12 or hydrogen, and R$^3$ represents an alkyl group having a carbon number of 1 to 12, an aryl group or hydrogen).

The polyolefin for use in the present invention may be a homopolymer of such a constituent unit or a copolymer of two or more species thereof. It is preferred that 5 or more repeating units are chemically bonded. If the number of the repeating units is less than 5, the polymer effect (for example, flexibility and expandability) can be hardly brought out.

Examples of the repeating unit above include an aliphatic olefin such as a repeating unit which appears when a terminal olefin is additional-polymerized (e.g., propene, 1-butene, 1-pentene, 4-methyl-1-pentene, 1-hexene, 1-octene, 1-decene, 1-dodecene), and a repeating unit when isobutene is added; and an aromatic olefin such as an addition polymer unit of a styrene monomer or a styrene-based monomer such as alkylated styrene (e.g., o-methylstyrene, m-methylstyrene, p-methylstyrene, o-ethylstyrene, m-ethylstyrene, o-ethylstyrene, o-tert-butylstyrene, m-tertbutylstyrene, p-tert-butylstyrene), halogenated styrene (e.g., monochlorostyrene) and terminal methylstyrene.

Examples of the homopolymer of such a repeating unit include a homopolymer of terminal olefin, such as low-density polyethylene, medium-density polyethylene, high-density polyethylene, linear low-density polyethylene, crosslinked polyethylene, polypropylene, polybutene, polypentene, polyhexene, polyoctenylene, polyisoprene and polybutadiene. Examples of the copolymer of the above-described repeating unit include, but are not limited to, an aliphatic polyolefin such as ethylene-propylene copolymer, ethylene-butene copolymer, ethylene-propylene-hexadiene copolymer and ethylene-propylene-5-ethylidene-2-norbornene copolymer, and an aromatic polyolefin such as styrene-based copolymer. The copolymer may be either a block copolymer or a random copolymer. One of these resins may be used alone or two or more species thereof may be used as a mixture.

In view of handleability and barrier property against corrosion-causing substances, most preferred are a low-density polyethylene, a medium-density polyethylene, a high-density polyethylene, a linear low-density polyethylene, a crosslinked polyethylene, a polypropylene and a mixture of two or more species thereof.

The polyolefin for use in the present invention is sufficient if the olefin unit described above is the main component, and a substitution product of the unit, that is, a vinyl monomer, a polar vinyl monomer or a diene monomer, may be copolymerized as a monomer unit or a resin unit. As for the copolymerization composition, the proportion of the monomer or resin unit is 50 mass % or less, preferably 30 mass % or less, based on the above-described olefin unit. If the proportion exceeds 50 mass %, the properties as an olefin-based resin, such as barrier property against corrosion-causing substances, are reduced.

Examples of the polar vinyl monomer include an acrylic acid, an acrylic acid derivative such as methyl acrylate and ethyl acrylate, a methacrylic acid, a methacrylic acid derivative such as methyl methacrylate and ethyl methacrylate, an acrylonitrile, a maleic anhydride, an imide derivative of maleic anhydride, and a vinyl chloride.

The functional group contained indicates a chemically modifying group having a high-polarity chemical structure grafted to a polyolefin through a covalent bond. The functional group having polarity is a functional group where elements with polarity differing in the Pauling electronegativity by 0.33 $(eV)^{0.5}$ or more are bonded. The functional group not having polarity is a hydrocarbon group. Examples of the functional group having polarity include an acid anhydride group, a hydroxyl group, a carboxyl group, an amide group, an amino group, an urethane group, an ester group, an imide group, a maleimide group, a chlorine group, a bromine group, an ether group, a thiol group, an epoxy group, a nitrile group and —$SO_3$—. The site at which this functional group is covalently bonded to the olefin-based oligomer may be the terminal of the oligomer molecule or the middle of the molecular chain. In view of adherence to the stainless steel foil, among these various functional groups, an acid anhydride group, a hydroxyl group, a carboxyl group, an amide group, a urethane group, an imide group, a maleimide group and a thiol group, which are a functional group having hydrogen bonding property or high polar interaction, are preferred, and a maleic anhydride group is more preferred. In order to avoid adverse effect on the physical properties of the polyolefin-based resin (A) and exhibit good adherence to the stainless steel foil, the content of the functional group having polarity is preferably from 0.0005 to 5 mmol/g, more preferably from 0.001 to 1.0 mmol/g.

The polyolefin-based resin (A) containing a functional group having polarity, which is coated in the present invention, may comprise either a single layer or a plurality of layers. Also, a resin such as polyolefin, polyester, polyamide and polyimide may be coated on the upper layer of the polyolefin-based resin (A) containing a functional group having polarity to result in configuration of a plurality of layers. In view of durability against electrolytic solution in battery usage, a polyolefin not containing a functional group having polarity is preferably coated on the surface layer of the polyolefin-based resin (A) containing a functional group having polarity on the side not in contact with the stainless steel foil.

The thickness of the polyolefin-based resin (A) layer coated in the present invention is preferably from 0.5 to 200 μm, more preferably from 15 to 100 μm. Also, even when a polyolefin, a polyester, a polyamide or a polyimide is stacked on the upper layer of the polyolefin-based resin (A) layer, the total thickness of layers stacked is preferably from 0.5 to 200 μm, more preferably from 15 to 100 μm. If the total layer thickness is less than 0.5 μm, permeation of corrosion-causing substances may not be sufficiently prevented, whereas if it exceeds 200 μm, this is improper as a member for a secondary battery container, for example, the workability is worsened, and an economical advantage can be hardly obtained (the cost becomes relatively high).

Figure 2:
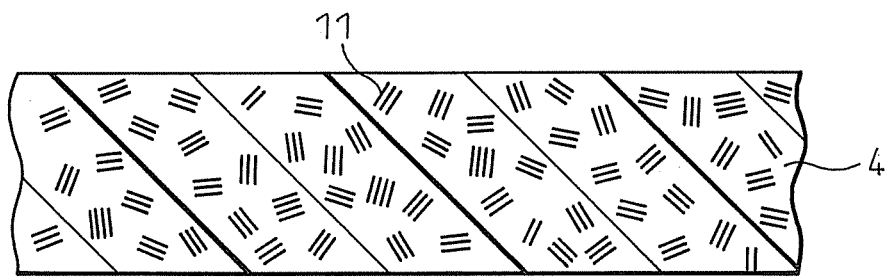
FIG. 2 is a cross-sectional schematic view showing the state of a layered inorganic material being dispersed in the polyolefin-based resin layer of the resin-coated stainless steel foil.

In one preferred embodiment of the present invention, a layered inorganic material (B) is preferably dispersed in the polyolefin resin layer of the resin-coated stainless steel foil. FIG. 2 schematically shows the state where a layered inorganic material (B) 11 is dispersed in the polyolefin resin layer 4.

The layered inorganic material (B) for use in this preferred embodiment is a stack of plate-like inorganic materials. In order to enhance the effect of improving the physical properties by the dispersion in a matrix polymer, the aspect ratio of the long side to the thickness of one inorganic material crystal layer is from 10 to 100,000, preferably from 50 to 5,000, more preferably from 100 to 500. The inorganic material crystal may be either a natural product or an artificially synthesized product. Examples of the natural product include clay minerals over a wide range. The clay mineral may be either ion-exchanging or non-ion-exchanging, and the ion-exchanging clay mineral may be either cation-exchanging or anion-exchanging. Examples of the cation-exchanging layered clay mineral include a smectite clay mineral such as montmorillonite, beidellite, nontronite, volkonskoite, saponite, iron saponite, sauconite, hectorite and stevensite. Examples of the anion-exchanging clay mineral include hydrotalcite. Also, examples of the clay mineral which is not ion-exchanging include mica, kaolinite, chlorite, vermiculite, pyrophyllite and brucite. However, in the present invention, the inorganic material is sufficient if it is a plate-like inorganic material crystal, and the inorganic material is not limited to those described above.

The dispersion diameter of the layered inorganic material (B) contained in the resin composition of the present invention is not particularly specified, but as the particle diameter of the layered inorganic material (B) dispersed is smaller and the aspect ratio of the long side to the thickness is greater, the interface area with the resin phase increases and a greater effect of improving the rigidity or mechanical strength is obtained even by the addition of the layered inorganic material (B) in a small amount. Specifically, the layered inorganic material is preferably dispersed to have a particle diameter of 1 μm or less. If the particle diameter of the layered inorganic material (B) exceeds 1 μm, the interface strength with the resin is insufficient and fragile breakage may occur. The dispersion diameter of the layered inorganic material (B) is preferably 200 nm or less, more preferably 200 nm or less, still more preferably 50 nm or less. Most preferably, the resin molecule is intercalated between layers of the layered inorganic material (B), and the layered inorganic material (B) is dispersed in the resin phase to have a particle diameter corresponding to the unit layer thickness. The aspect ratio of the long side to the thickness is from 10 to 100,000, preferably from 50 to 5,000, more preferably from 100 to 500. Within this range, the layered inorganic material (B) acts as an obstacle to the permeation of a corrosion-causing substance for the stainless steel foil through the coated resin composition and contributes to a decrease in the permeation ratio (detouring effect), or the layered inorganic material (B) becomes an obstacle to the movement of the resin composition molecule and restrains the moving property, whereby the linear expansion coefficient of a member is decreased (enhancement of dimensional precision) or tensile strength, elastic modulus or creep resistance is enhanced.

Although described in detail later, a separation test of a stainless steel foil coated with various resin compositions in an electrolytic solution revealed that the resin composition having dispersed therein a layered inorganic material (B) is enhanced in the separation resistance as compared with the composition where a layered inorganic material is not dispersed. That is, when a resin-coated stainless steel foil coated with this resin composition is used, the corrosion resistance required of the material for a secondary battery container is enhanced and a secondary battery with a longer life can be provided.

The layered inorganic material (B) for use in the present invention may be dispersed in the entire resin composition, may be dispersed in any one part of the matrix phase and the dispersion phase, or may be unevenly dispersed, but most preferred is a structure where the layered inorganic material (B) is uniformly dispersed in the matrix resin. A continuous phase governs the mechanical properties of a bulk in many cases and when the layered inorganic compound is uniformly dispersed in the matrix phase, the effect of enhancing the rigidity or mechanical strength can be readily brought out.

Examples of the method for confirming the dispersion diameter or dispersed state of the layered inorganic material (B) include a method of directly observing the dispersion by an electron microscope and a method of calculating the interplane distance from peaks of a specific crystal plane in a wide-angle X-ray diffraction. In a wide-angle X-ray diffraction, when the resin molecule is intercalated between layers of the layered inorganic material (B), the crystal plane peak is shifted to the low-angle side or becomes broad, from which the degree of intercalation can be known or the dispersed state can be estimated. In particular, when a crystal peak disappears, this means that the intercalation of the resin molecule between layers of the layered inorganic material (B) proceeds and the layers are separated, which corresponds to a structure where the layered inorganic material (B) is dispersed to the unit layer thickness in the resin.

The layered inorganic material (B) for use in the present invention may be one species or two or more species of clay minerals.

The resin layer coated on the other surface of a stainless steel foil having coated on one surface thereof the polyolefin resin (A) layer, according to an another aspect of the resin-coated stainless steel foil of the present invention, is described below.

The resin layer coated on the other surface of the stainless steel foil is not particularly limited and various resin compositions such as thermoplastic resin, thermosetting resin, ultraviolet-curable resin and electron beam-curable resin can be applied. Above all, a resin composition comprising, as the main component, one species or two or more species selected from the group consisting of a polyolefin, a polyester, a polyamide and a polyimide is preferably used. In particular, a polyester-based resin (E) having finely dispersed therein a rubbery elastomer resin (D) capsulated with a vinyl polymer (C) having a polar group is preferred. By coating the other surface with a resin composition comprising, as the main component, one species or two or more species selected from the group consisting of a polyolefin, a polyester, a polyamide, a polyimide and a polyester-based resin (E), workability, design property and the like can be imparted to the stainless steel foil in many cases and depending on the case, an insulating property and the like may be further imparted. The resin layer may be a single layer or a multilayer and the total layer thickness is preferably from 0.5 to 200 μm, more preferably from 15 to 100 μm. If the thickness is less than 0.5 μm, functions such as workability, design property and insulating property may not be satisfactorily imparted, whereas if it exceeds 200 μm, the resin-coated stainless steel foil may become improper as a member for a secondary battery, for example, may be worsened in the workability, and an economical advantage is also difficult to bring out.

The polyolefin for use in the present invention is a resin comprising, as the main component, a resin having a represented unit represented by formula (1).

The polyester for use in the present invention is a thermoplastic polyester with the constituent unit being only a hydroxycarboxylic acid compound residue, a thermoplastic polyester with the constituent unit being a hydroxycarboxylic acid compound residue and a diol compound residue, or a thermoplastic polyester with the constituent unit being a hydroxycarboxylic acid compound residue, a dicarboxylic acid residue and a diol compound residue. A mixture thereof may also be used.

Examples of the hydroxycarboxylic acid compound as a raw material of the hydroxycarboxylic acid compound residue include p-hydroxybenzoic acid, p-hydroxyethylbenzoic acid, and 2-(4-hydroxyphenyl)-2-(4'-carboxyphenyl)propane. One of these compounds may be used alone, or two or more species thereof may be used as a mixture.

Examples of the dicarboxylic acid compound forming the dicarboxylic acid residue include an aromatic dicarboxylic acid such as terephthalic acid, isophthalic acid, orthoisophthalic acid, 1,4-naphthalenedicarboxylic acid, 2,3-naphthalenedicarboxylic acid, 2,6-naphthalenedicarboxylic acid, 2,7-naphthalenedicarboxylic acid, diphenic acid, diphenyldicarboxylic acid and diphenoxyethanedicarboxylic acid; an aliphatic dicarboxylic acid such as adipic acid, pimelic acid, sebacic acid, azelaic acid, decanedicarboxylic acid, malonic acid, succinic acid, malic acid and citric acid; and an alicyclic dicarboxylic acid such as cyclohexanedicarboxylic acid. One of these compounds may be used alone, or two or more species may be used as a mixture.

Examples of the diol compound forming the diol residue include an aromatic diol such as 2,2-bis(4-hydroxyphenyl) propane (hereinafter simply referred to as "bisphenol A"), bis(4-hydroxyphenyl)methane, bis(2-hydroxyphenyl)methane, o-hydroxyphenyl-p-hydroxyphenylmethane, bis(4-hydroxyphenyl)ether, bis(4-hydroxyphenyl)sulfone, bis(4-hydroxyphenyl)sulfide, bis(4-hydroxyphenyl)sulfone, bis(4-hydroxyphenyl)ketone, bis(4-hydroxyphenyl)diphenylmethane, bis(4-hydroxyphenyl)-p-diisopropylbenzene, bis(3,5-dimethyl-4-hydroxyphenyl)methane, bis(3-methyl-4-hydroxyphenyl)methane, bis(3,5-dimethyl-4-hydroxyphenyl)ether, bis(3,5-dimethyl-4-hydroxyphenyl)sulfone, bis(3,5-dimethyl-4-hydroxyphenyl)sulfide, 1,1-bis(4-hydroxyphenyl)ethane, 1,1-bis(3,5-dimethyl-4-hydroxyphenyl)ethane, 1,1-bis(4-hydroxyphenyl)cyclohexane, 1,1-bis(4-hydroxyphenyl)-3,3,5-trimethylcyclohexane, 1,1-bis(4-hydroxyphenyl)-1-phenylethane, bis(4-hydroxyphenyl)phenylmethane, 2,2-bis(4-hydroxyphenyl)propane, 2,2-bis(4-hydroxyphenyl)butane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-methyl-4-hydroxyphenyl)propane, 2,2-bis(3-chloro-4-hydroxyphenyl)propane, 2,2-bis(3-bromo-4-hydroxyphenyl)propane, 1,1,1,3,3,3-hexafluoro-2,2-bis(4-hydroxyphenyl)propane, 4,4'-biphenol, 3,3', 5,5'-tetramethyl-4,4'-dihydroxybiphenyl and 4,4'-dihydroxybenzophenone; an aliphatic diol such as ethylene glycol, trimethylene glycol, propylene glycol, tetramethylene glycol, 1,4-butanediol, pentamethylene glycol, neopentyl glycol, hexamethylene glycol, dodecamethylene glycol, diethylene glycol, triethylene glycol, tetraethylene glycol, polyethylene glycol and hydrogenated bisphenol A; and an alicyclic diol such as cyclohexanedimethanol. One of these compounds may be used alone, or two or more species may be used as a mixture. Also, as for the polyester resin obtained from such a compound, one species may be used alone, or two or more species may be used as a mixture.

The polyester for use in the present invention may be sufficient if it is composed of such a compound or a combination of these compounds, but above all, an aromatic polyester resin composed of an aromatic dicarboxylic acid residue and a diol residue is preferred in view of workability and thermal stability.

The polyester for use in the present invention may also contain a constituent unit derived from a polyfunctional compound such as trimesic acid, pyromellitic acid, trimethylolethane, trimethylolpropane, trimethylolmethane and pentaerythritol, in a small amount, for example in an amount of 2 mol % or less.

Out of combinations of a dicarboxylic acid compound and a diol compound, a combination of a dicarboxylic acid compound comprising from 50 to 95 mol % of terephthalic acid and from 50 to 5 mol % of isophthalic acid and/or orthophthalic acid and a diol compound of glycol having a carbon number of 2 to 5 is most preferred in view of heat resistance and workability.

Preferred examples of the polyester for use in the present invention include polyethylene terephthalate, polybutylene terephthalate, polyhexamethylene terephthalate, polycyclohexylenedimethylene terephthalate, polyethylene-2,6-naphthalate and polybutylene-2,6-naphthalate. Among these, polyethylene terephthalate, polybutylene terephthalate, polyethylene-2,6-naphthalate and polybutylene-2,6-naphthalate are most preferred because of their appropriate mechanical property, gas barrier property and adherence to metal.

It is preferred that the polyester for use in the present invention has a glass transition temperature (Tg, measured by a differential scanning calorimeter (DSC) with a sample amount of about 10 mg and a temperature rising rate of 10° C./min) of usually from 50 to 120° C., preferably from 60 to 100° C. The polyester may be amorphous or crystalline. In the case of a crystalline polyester, it is preferred that the polyester has a crystal melting temperature (Tm) of usually from 210 to 265° C., preferably from 210 to 245° C., and a low crystallization temperature (Tc) of usually from 110 to 220° C., preferably from 120 to 215° C. If the Tm is less than 210° C. or the Tc is less than 110° C., heat resistance is insufficient and the film shape may not be maintained at the drawing work, whereas if the Tm exceeds 265° C. or the Tc exceeds 220° C., the resin may be unable to fill in the surface irregularities of the stainless steel foil, giving rise to an adherence failure.

Examples of the polyamide for use in the present invention include nylon 6, nylon 66, nylon 69, nylon 46, nylon 610, nylon 12, polymethaxylene adipamide, and a copolymer or blend of these components.

The polyimide for use in the present invention means a polyimide-based resin in general and indicates a polymer having an imide group in the structure, such as polyimide, polyamideimide, polyetherimide, polysiloxaneimide and polybenzimidazoleimide.

Figure 3:
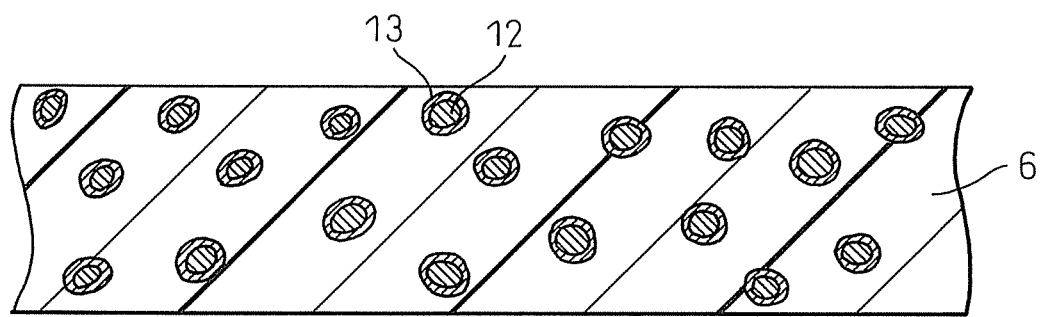
FIG. 3 is a schematic cross-sectional view showing a resin layer composed of a polyester resin having finely dispersed therein a rubbery elastomer resin capsulated with a vinyl polymer.

Out of these polyester resins used in the preferred embodiment of the present invention, the polyester-based resin (E) having finely dispersed therein a rubbery elastomer resin (D) capsulated with a vinyl polymer (C) having a polar group is a resin composition having three components of vinyl polymer-rubbery elastomer resin-polyester resin. FIG. 3 schematically shows such a resin composition, where a rubbery elastomer resin (D) 13 capsulated with a vinyl polymer (C) 12 having a polar group is finely dispersed in a polyester resin 6.

The vinyl polymer (C) containing a polar group is a vinyl polymer containing 1-mass % or more of a unit containing a group having bonded thereto an element having a Pauling electronegativity difference of 0.33 $(eV)^{0.5}$ or more. If the content of the unit having a polar group is less than 1 mass %, even when the rubbery elastomer resin (D) is capsulated with a vinyl polymer (C) having a polar group, sufficient adherence to a stainless steel foil cannot be brought out.

Specific examples of the group having bonded thereto an element having a Pauling electronegativity difference of $0.33^{(eV)}0.5$ or more include a hydroxyl group, a carbonyl group, a carbonyloxy group, an epoxy group, an acid anhydride group, a dicarbonylimide group ($—(C(O))_2N—$), a nitrile group, an amino group, an imino group, —X (X: a chlorine group or a bromine group) and $—SO_3—$.

As for examples of the unit having a polar group, examples of the unit having a hydroxyl group include a vinyl alcohol; examples of the unit having a carbonyl group include vinyl chloromethyl ketone; examples of the unit having a carbonyloxy group include a vinyl acid such as acrylic acid, methacrylic acid, vinyl acetate and vinyl propionate, and a metal salt or ester derivative thereof; examples of the unit having an epoxy group include a glycidyl ester of α,β-unsaturated acid, such as glycidyl acrylate, glycidyl methacrylate, glycidyl ethacrylate and glycidyl itacrylate; examples of the unit having an acid anhydride group include maleic anhydride; examples of the unit having a dicarbonylimide group include an imide derivative of maleic anhydride; examples of the unit having a —CN group include acrylonitrile; examples of the unit having an amino group include acrylamine; examples of the unit having an imino group include an acrylamide; examples of the unit having an —X group include vinyl chloride; and examples of the unit having an $—SO_3—$ group include a styrenesulfonic acid. One of these units or a plurality thereof may be contained in the vinyl polymer (C). The unit having a polar group contained in the vinyl polymer (C) is sufficient if it is a unit containing a group having bonded thereto an element having a Pauling electronegativity difference of 0.33 (eV)$^{0.5}$ or more, and is not limited to specific examples above.

Examples of the polar group-containing vinyl polymer (C) for use in the present invention include a polymer comprising one species or two or more species of those polar group-containing units, and a copolymer of the polar group-containing unit and a nonpolar vinyl monomer represented by the following formula (formula 2):

$$—R^4CH=CR^5R^6—\qquad\text{(formula 2)}$$

(where $R^4$ and $R^5$ each independently represents an alkyl group having a carbon number of 1 to 12 or hydrogen, and $R^6$ represents an alkyl group having a carbon number of 1 to 12, a phenyl group or hydrogen).

Specific examples of the nonpolar vinyl monomer of formula (formula 2) include an aliphatic vinyl monomer such as α-olefin (e.g., ethylene, propylene, 1-butene, 1-pentene, 4-methyl-1-pentene, 1-hexene, 1-octene, 1-decene, 1-dodecene), isobutene and isobutylene; and an aromatic vinyl monomer such as styrene monomer, alkylated styrene (e.g., o-methylstyrene, m-methylstyrene, p-methylstyrene, o-ethylstyrene, m-ethylstyrene, p-ethylstyrene, tert-butylstyrene) and addition polymer unit of styrene-based monomer (e.g., α-methylstyrene).

Examples of the homopolymer of a polar group-containing unit include polyvinyl alcohol, polymethyl methacrylate and polyvinyl acetate. Examples of the copolymer of a polymer group-containing unit and a nonpolar vinyl monomer include an ethylene-methacrylic acid copolymer, an ethylene-acrylic acid copolymer, an ethylene-vinyl acetate copolymer, an ionomer resin where a part or all of carboxylic acids in such a copolymer is neutralized with metal ion, an ethylene-methyl acrylate copolymer, an ethylene-ethyl acrylate copolymer, an ethylene-methyl methacrylate copolymer, an ethylene-ethyl methacrylate copolymer, an ethylene-glycidyl methacrylate copolymer, an ethylene-maleic anhydride copolymer, a butene-ethylene-glycidyl methacrylate copolymer, a styrene-methyl methacrylate copolymer, a styrene-acrylonitrile copolymer, and a styrene-maleic anhydride copolymer. From the standpoint of ensuring barrier property, the preferred combination is a copolymer of an α-olefin and a unit having a polar group.

The polar group-containing vinyl polymer (C) for use in the present invention is sufficient if it is a vinyl monomer containing 1 mass % or more of the unit having a polar group, and is not limited to those specific examples. The molecular weight of the polar group-containing vinyl polymer (C) is not particularly limited but is preferably, in terms of the number average molecular weight, from 2,000 to 500,000. If the molecular weight is less than 2,000 or exceeds 500,000, the rubbery elastomer resin (D) may not be sufficiently capsulated.

As for the rubbery elastomer resin (D) used in the present invention, known rubbery elastomer resins can be widely used. Above all, a rubbery elastomer resin having a glass transition temperature (Tg, measured by a differential scanning calorimeter (DSC) with a sample amount of about 10 mg and a temperature rising rate of 10° C./min) in the rubber elasticity-developing part of 50° C., a Young's modulus at room temperature of 1,000 MPa and an elongation at break of 50% or more is preferred. If the Tg in the rubber elasticity-developing part exceeds 50° C., if the Young's modulus at room temperature exceeds 1,000 MPa or if the elongation at break is less than 50%, satisfactory workability cannot be brought out. In order to ensure workability at low temperatures, Tg is preferably 10° C. or less, more preferably −30° C. or less. Also, in order to more unfailingly ensure the workability, the Young's modulus at room temperature is preferably 100 MPa or less, more preferably 10 MPa or less, and the elongation at break is preferably 100% or more, more preferably 300% or more.

Specific examples of the rubbery elastomer resin (D) for use in the present invention include a polyolefin resin; a diene-based elastomer such as butadiene-styrene copolymer (SBR), acrylonitrile-butadiene copolymer (NBR), polyisoprene (IPR) and polybutadiene (BR); a styrene-based elastomer such as styrene-butadiene-styrene copolymer (SBS) and its hydrogenated product (SEBS), rubber-modified styrene (HIPS) and acrylonitrile-styrene-butadiene copolymer (ABS); a silicon elastomer comprising dimethylsiloxane as the main component; a polyester elastomer such as aromatic polyester-aliphatic polyester copolymer and aromatic polyester-polyether copolymer; and a nylon elastomer. Among these, a polyolefin resin is preferred because of its low water vapor permeability. As for the polyolefin resin, most preferred resins for imparting working strength are a copolymer of ethylene and α-olefin having a carbon number of 3 or more, such as ethylene-propylene copolymer, ethylene-1-butene copolymer, ethylene-1-pentene copolymer, ethylene-3-ethylpentene copolymer and ethylene-1-octene copolymer; and a ternary copolymer comprising ethylene, α-olefin having a carbon number of 3 or more, and non-conjugated diene, obtained by copolymerizing a secondary copolymer above with butadiene, isoprene, 5-methylidene-2-norbornene, 5-ethylidene-2-norbornene, dicyclopentadiene, 1,4-hexadiene or the like. Above all, in view of easy handling, a secondary copolymer such as ethylene-propylene copolymer and ethylene-1-butene copolymer, and a resin obtained by copolymerizing an ethylene-propylene copolymer or an ethylene-1-butene copolymer with 0.5 to 10 mol % of a non-conjugated diene, in which the amount of α-olefin is from 20 to 60 mol % and 5-methylidene-2-norbornene, 5-ethylidene-2-norbornene, dicyclopentadiene or 1,4-hexadiene is used as the non-conjugated diene, are most preferred.

The polyester-based resin (E) for use in the present invention is a resin composition where a rubbery elastomer resin (D) capsulated with a vinyl polymer (C) containing a polar group is dispersed in the above-described polyester matrix. The resin composition for the coating of a metal sheet of the present invention preferably contains a polyester having an intrinsic viscosity of 0.5 to 2.0 dl/g, a rubbery elastomer resin (D) and a polar group-containing vinyl polymer (C) and preferably has a structure where the rubbery elastomer resin (D) is finely dispersed in the polyester matrix and at least a part of the rubbery elastomer resin (D) is capsulated with the vinyl polymer (C).

The term "finely dispersed" as used herein means a state where the rubbery elastomer resin (D) is dispersed to an average dispersion diameter of 100 μm or less in the polyester matrix. If the average dispersion diameter of the rubbery elastomer resin (D) exceeds 100 μm, it becomes difficult to process the resin composition of the present invention into a film. The average dispersion diameter is preferably 1 μm or less, more preferably 0.5 μm or less. When the average dispersion diameter exceeds 1 μm, satisfactory workability is sometimes not brought out.

The dispersion diameter of the rubbery elastomer (D) is measured by the following method. The cross section of the sheet is cut out in an arbitrary direction, the rubbery elastomer (D) phase and other phases are each differentially observed by a method capable of discrimination, and the dispersion diameter is measured.

More specifically, the sheet is dyed with a solvent capable of dyeing only the rubbery elastomer (D) phase and then observed through a transmission electron microscope (TEM), and the dispersion diameter of the rubbery elastomer (D) phase is measured. At the measurement, the number of rubbery elastomer (D) phases observed is not specified, but in view of statistical significance, the dispersion diameter is preferably determined by extracting 20 or more phases, more preferably 30 or more phases.

Also, the "rubbery elastomer resin (D) capsulated with a vinyl polymer (C)" means a structure where 80% or more, preferably 95% or more, of the rubbery elastomer resin (D) interface is covered by the vinyl polymer (C) and the area of direct contact between the polyester and the rubbery elastomer resin (D) is less than 20%. By taking such a structure, the adherence between the resin composition and the metal sheet can be ensured even if the rubbery elastomer resin (D) is put into contact with the metal sheet, because the vinyl polymer (C) has adherence to the metal sheet.

The vinyl polymer (C) needs not capsulate the entirety of the rubbery elastomer resin (D), and it is sufficient if 70% or more, in terms of volume ratio, of the rubbery elastomer resin (D) is capsulated with the vinyl polymer (C). If an uncapsulated rubbery elastomer resin (D) is present in a ratio of more than 30% in terms of volume ratio, when the resin composition is coated on a metal sheet, the proportion of the rubbery elastomer resin (D) in direct contact with the metal sheet increases and the adherence between the resin composition and the metal sheet cannot be ensured. The average dispersion diameter of the uncapsulated rubbery elastomer resin (D) is not particularly specified but in view of workability, is preferably 0.5 µm or less.

Also, an excess amount of the vinyl polymer (C) may be dispersed by itself in the polyester matrix without capsulating the rubbery elastomer resin (D). The amount and diameter of the non-capsulating vinyl polymer (C) are not particularly limited but are preferably 20% or less in terms of volume ratio to the entire vinyl polymer (C) and 0.5 µm or less in terms of average dispersion diameter. If the volume ratio exceeds 20%, the fundamental properties such as heat resistance of the resin composition may change in some cases. Also, if the average dispersion diameter exceeds 0.5 µm, the workability is sometimes lowered.

The resin composition for the coating of a stainless steel foil for use in the present invention is sufficient if it has the above-described structure, and its formulation is not particularly limited, but the resin composition is preferably a resin composition for the coating of a metal sheet, comprising from 1 to 50 parts by mass of a rubbery elastomer resin (D) and from 1 to 50 parts by mass of a vinyl polymer (C) per 100 parts by mass of a polyester-based resin (E) and further containing from 0.001 to 7 parts by mass of an antioxidant per 100 parts by mass of the resin composition. If the proportion of the rubbery elastomer resin (D) is less than 1 part by mass, sufficient workability may not be imparted, whereas if it exceeds 50 parts by mass, heat resistance sometimes decreases. If the proportion of the vinyl polymer (C) is less than 1 part by mass, the rubbery elastomer resin (D) cannot be sometimes satisfactorily capsulated, whereas if it exceeds 50 parts by mass, heat resistance may decrease.

The intrinsic viscosity of the polyester-based resin (E) for use in the present invention is from 0.5 to 2.0 dl/g, preferably from 0.65 to 1.7 dl/g, more preferably from 0.8 to 1.5 dl/g. If the intrinsic viscosity is less than 0.5 dl/g, the resin is not uniformly mixed with the rubbery elastomer resin (D) or the polar monomer-containing vinyl polymer (C) and therefore, the mechanical strength or workability is low, whereas if the intrinsic viscosity exceeds 2.0 dl/g, the moldability becomes poor, which are not preferred.

The intrinsic viscosity is measured at a concentration of 0.5% in o-chlorophenol at 25° C. and determined according to the following formula (i). In formula (I), C represents the concentration in terms of number of grams of the resin per 100 ml of the solution, t0 represents the flow time of the solvent, and t represents the flow time of the solution.

$$\text{Intrinsic viscosity} = \{\ln(t/t0)\}/C \qquad (i)$$

The polyester-based resin (E) having finely dispersed therein a rubbery elastomer resin (D) capsulated with a polar group-containing vinyl polymer (C) has good adherence to a stainless steel foil as compared with conventional polyolefin, polyester, polyamide, polyimide or the like and ensures good workability without causing cracking or separation even when the coated foil is worked. This is achieved because the rubbery elastomer resin (D) can be finely dispersed by capsulating the rubbery elastomer resin (D) with the polar group-containing vinyl polymer (C). Accordingly, the matrix polymer can be appropriately soft and at the same time, suppress cracking or propagation of cracks, so that remarkable enhancement of the workability can be realized. As a result, when the resin composition is coated on a stainless steel foil for a secondary battery and the stainless steel foil is worked, the laminate film can be kept in an almost defect-free state and application of severe working to the laminate metal material becomes possible. Also, it can be realized to omit use of a lubricant at the shaping such as drawing work and dispense with three steps of degreasing, coating of lubricating oil and removal of lubricating oil required before and after the working. Furthermore, abrasion of the mold which cannot be satisfactorily prevented even when using a lubricant can be suppressed and prolongation of the mold life can be realized.

The polar group-containing vinyl polymer (C) is finely dispersed in the polyester-based resin (E), so that unexpectedly, the resin can be well compatible with the printing ink to ensure excellent printability, and in turn, endowment of design property to a stainless steel foil for a secondary battery container, to which a design property is originally difficult to impart, can be realized. Not limited to the polyester-based resin (E), the printing surface of a resin composition coated on a stainless steel foil is preferably subjected to a corona treatment.

In this way, coating of a polyolefin-based resin (A) containing a functional group having porality on one surface of a stainless steel foil and coating of a polyester-based resin (E) on the other surface are a more preferred combination, because a member satisfying all of corrosion resistance, workability, design property and piecing resistance in an electrolytic solution, which are properties required of the recent secondary battery, can be more easily provided by stable industrial production.

In various resin compositions used in the present invention, in addition to the above-described antioxidant, a thermal stabilizer, a light stabilizer, a releasing agent, a lubricant, a pigment, a flame retarder, a plasticizer, an antistatic agent, an antibacterial antifungal agent and the like may be added each in an appropriate amount.

On the surface of the stainless steel foil on the side where the polyolefin-based resin (A) is coated, a chromate treatment layer controlled to a thickness of 2 to 200 nm, preferably from 5 to 60 nm, still more preferably from 8 to 40 nm, is provided, but a surface preparation treatment is preferably applied also to the surface on the side where other resins are coated. By applying a surface preparation treatment, the chemical adherence force between the resin composition and the stainless steel foil can be increased. Specifically, the surface preparation treatment includes a method of subjecting the stainless steel foil surface to a treatment of removing oil or scale, if desired, and then to a chemical conversion treatment. Examples of the descaling treatment include acid pickling, sand blasting and grid blasting, and examples of the chemical conversion treatment include a chromate treatment, a non-chromate treatment not using $Cr^{+6}$, a strike plating treatment, an epoxy primer treatment, a silane coupling treatment and a titanium coupling treatment. Above all, a surface preparation treatment using a combination of acid pickling or sand blasting with a chromate treatment, a non-chromate treatment, a strike plating treatment or an epoxy primer treatment is preferred from the standpoint of increasing the chemical adherence force between the resin sheet and the stainless steel foil.

Furthermore, in order to more increase the chemical adherence force between the resin composition and the stainless steel foil, it is preferred to provide an adhesive layer on the stainless steel foil surface, more preferably on the surface of the stainless steel foil subjected to the above-described surface preparation treatment, and stack the resin composition on the top of the adhesive layer. Known adhesives can be widely used for the adhesive layer. The specific resin system is determined according to the surface property of the stainless steel foil or the component system of the resin composition coated, but a polyolefin-based resin containing, as the polar group, one species or a plurality of species selected from a carboxyl group, a metal salt of carboxyl group, an acid anhydride group, an amide group, an amino group, an epoxy group and an alcohol group can be suitably used as the adhesive. Specific examples of the method for stacking the adhesive layer and the resin film of the present invention in this order on the stainless steel foil surface include a method where an adhesive resin or a resin with excellent adhesive property such as polyolefin-based resin (A) of the present invention and a polyolefin film or the polyester-based resin (E) of the present invention are stacked as a lower layer and an upper layer, respectively on the stainless steel foil surface by a two-layer extrusion or the like, and a method where an adhesive resin and a sheet or film of the resin composition are individually shaped and these are stacked at the surface lamination of the stainless steel foil. In view of production efficiency, the former is preferred. At the stacking, for example, the stainless steel foil is preferably heated at a temperature not lower than the melting point of the adhesive resin so as to bring out a satisfactory anchor effect by plasticizing the adhesive layer resin or increase the chemical interaction between the steel material and the adhesive.

The method for coating those various resin compositions on a stainless steel foil subjected as described above to a surface preparation treatment is described below.

Various types of resin compositions described above each is melt-kneaded by an extruder with a T-die, or the like and shaped into a sheet or a film. The sheet or film may be stretched in an uniaxial or biaxial direction and this is not particularly limited. The sheet or film is coated on a stainless steel foil by thermocompression bonding, heat pressing or the like. The sheet or film may be stacked as a single layer or a multilayer. More specifically, on the outermost surface layer, an acryl film or the like may be stacked to enhance weather resistance, a polyester-based film may be stacked to enhance surface hardness, a printing layer may be provided to enhance the design property, or a flame-retardant, plastic, antistatic or antibacterial antifungal layer may be stacked.

The form of the resin composition for coating of the present invention is sufficient if it is coated like a layer when coated on a stainless steel foil, and the thickness or the shape before coating is not particularly specified, but as described above, the thickness of the coated resin layer is preferably from 0.5 to 200 μm.

In the present invention, a known method can be used when coating various resin compositions on a stainless steel foil. Specifically, the resin composition can be coated on a stainless steel foil by, for example, (1) a method of melt-kneading and forming the resin composition into a film shape by an extruder with a T-die and immediately after the extrusion, coating the film by thermocompression bonding on a stainless steel foil, (2) a method of coating a previously extruded or shaped sheet or film (in this case, the sheet or film may be stretched in an uniaxial or biaxial direction) by thermocompression bonding or pressure bonding using an adhesive or the like, (3) a method of melting the resin composition and coating the melt by a bar coater or a roll, (4) a method of dipping a stainless steel foil in the melted resin composition, or (5) a method of dissolving the composition in a solvent and spin-coating the solution, but the coating method is not limited. Among these methods, in view of operating efficiency, methods (1) and (2) are most preferred as the coating method on a stainless steel foil.

A container using the above-described stainless steel foil is described below.

The method for forming the stainless steel foil into a container shape may be a conventional method such as pressing, punching and drawing and is not particularly limited. The shape of the container may be an angular cylindrical shape, a circular cylindrical shape or the like of a rectangular solid and is not particularly limited. In use as a container, the container is preferably closed by joining together the stainless steel foils at the top and bottom. At this time, stainless steel foils drawn by pressing work or the like may be laminated to each other or only one member may be drawn. For closing the container, a conventional bonding method may be used, and specific examples thereof include a method of adhering the stainless steel foils by using an adhesive, and a method of adhering the stainless steel foils through thermal fusion by heat sealing. Although not particularly limited, heat sealing is preferred in view of productivity. In applying heat sealing, the surfaces each coated with a polyolefin-based resin (A) are preferably joined together.

A secondary battery using the above-described container obtained by shape-forming the stainless steel foil is described below.

Battery elements such as positive electrode, negative electrode and separator, and battery content parts such as electrolytic solution are housed in the above-described container to produce a secondary battery. The shape of the battery element is not limited, but an element made thin by winding or flattening is compact and preferred. The secondary battery is not particularly limited also in its kind, and examples thereof include a lithium ion battery, a lithium polymer battery, a nickel hydrogen battery and a nickel cadmium battery.

Figure 4:
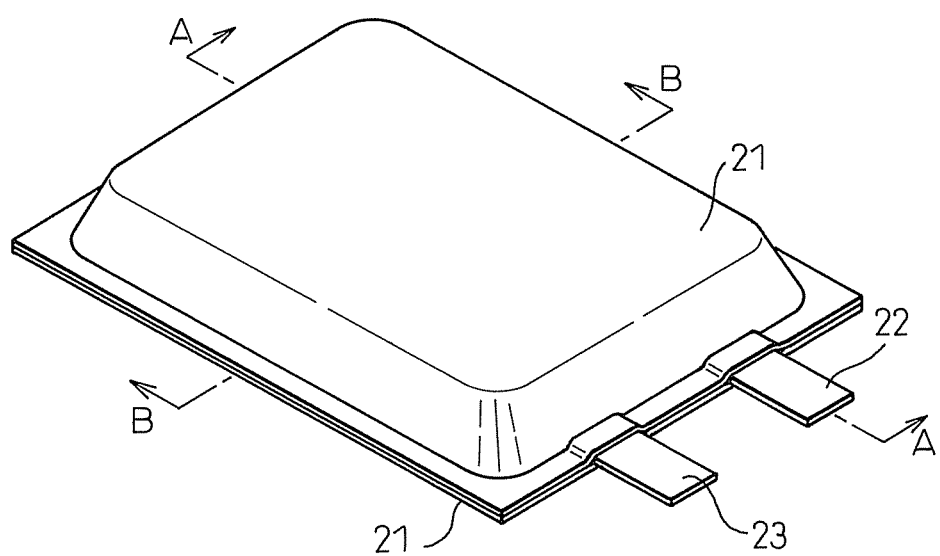
FIGS. 4 to 6 each schematically shows an example of a lithium secondary battery as the secondary battery using the container obtained by shape-forming the resin-coated stainless steel foil.
Figure 5:
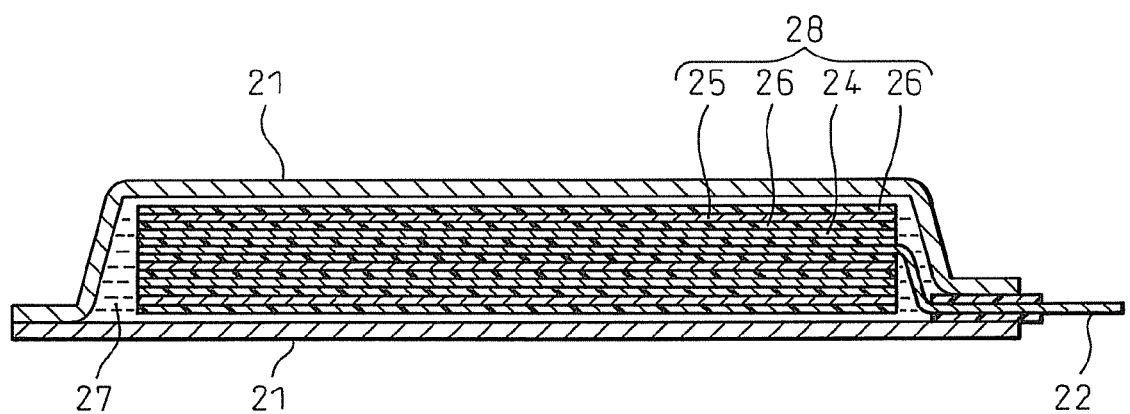
Figure 6:
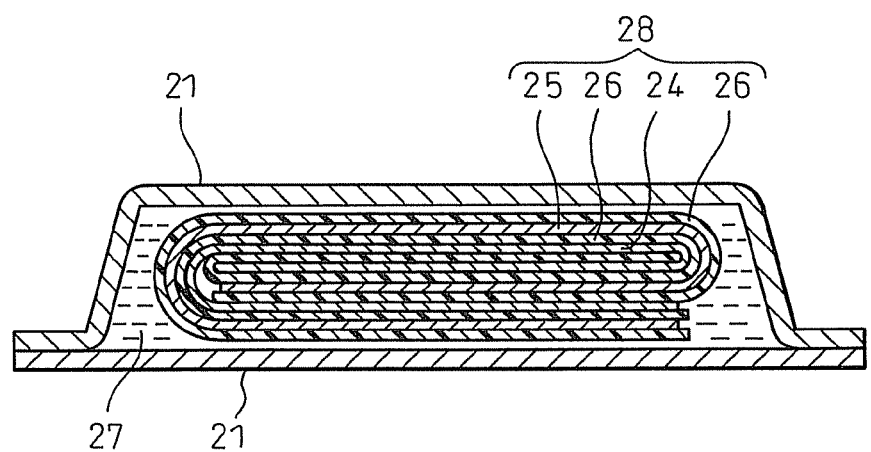

FIGS. 4 to 6 each schematically shows an example of the secondary battery using the container obtained by shape-forming the stainless steel foil. FIG. 4 is a perspective view schematically showing the construction of a lithium secondary battery, FIG. 5 is a laterally viewed cross section along the A-A line of FIG. 4, and FIG. 6 is a laterally viewed cross section along the B-B line of FIG. 4. The battery jacket material 21 is produced by laminating the stainless steel foils of the present invention, one being press-formed into a recessed shape for placing the battery contents therein and another being flat, by a technique such as welding or heat sealing. The numeral 22 is a positive terminal area and 23 is a negative terminal area. The battery content is a battery element 28 prepared by winding or flattening a stack consisting of a positive electrode 24 and a negative electrode 25 through a separator 26, that is, positive electrode 24/separator 26/negative electrode 25/separator 26, and impregnating the stack with an electrolytic solution 27. The electrolytic solution 27 may be filled in the battery.

As described above, application of a stainless steel foil to a secondary battery container has been difficult in view of corrosion resistance, workability and design property as compared with an aluminum foil and the like which have been heretofore employed as a metal foil for a secondary battery container. However, when a suitable surface preparation treatment is applied as in the present invention and a film having good adherence to a stainless steel foil and good workability is subjected to printing and then coated, unexpectedly, a resin-coated stainless steel foil having all of corrosion resistance, workability and design property required of the secondary battery container of today can be produced. The resin-coated stainless steel foil of the present invention causes no separation of the polyolefin-based resin coated even when dipped in an electrolytic solution for a long time, is markedly enhanced in the corrosion resistance as compared with the conventional metal foil for a secondary battery container, allows for working into a free shape, is assured of good design property, and is excellent in the piecing resistance by virtue of far higher strength than that of the aluminum foil and the like which have been conventionally used as a metal foil of a secondary battery container.

As a result, a resin-coated stainless steel foil, a container and a secondary battery, which are usable in a severer use environment than conventional, endowed with a long file and capable of satisfying both productivity and design property and which are unobtainable by conventional techniques, can be provided.

EXAMPLES

The present invention is described in greater detail below by referring to Examples and Comparative Examples, but the present invention is not limited only to these Examples.

Examples 1 to 16

The stainless steel foil used in these Examples was 50 µm-thick SUS316L BRIGHT A produced by Nippon Steel Corp.

The nickel strike plating in Examples 9 to 16 and Comparative Examples 2 to 4 was performed as follows. The stainless steel foil was subjected to acid pickling in an aqueous 30 mol % sulfuric acid solution, acid pickling in an aqueous 15 mol % hydrochloric acid solution, and nickel strike plating in a bath containing 240 g/L of nickel chloride and 125 mL/L of hydrochloric acid (specific gravity: 1.18), to which electricity at a cathode current density of 5 A/dm$^2$ was passed for 5 seconds. These treatments all were performed at ordinary temperature.

The chromate treatment was performed using a bath containing 25 g/L of chromium anhydride, 3 g/L of sulfuric acid and 4 g/L of nitric acid, in which phosphoric acid, hydrochloric acid, ammonium fluoride or the like was appropriately added, at a cathode current density of 25 A/dm$^2$ to form a chromate treatment layer. The treating time was made long when obtaining a large plated amount in the chromate treatment and made short when obtaining a small plated amount. Specifically, the electricity was passed for 360 seconds in the case of obtaining a treatment layer of 200 nm, for 20 seconds in the case of 15 nm, and 1 second in the case of 1.4 nm. The coat thickness is not proportional to the electricity passing time, and the coat thickness cannot be controlled, for example, by the electricity passed, presumed reaction amount or the like. Therefore, the thickness of the chromate treatment layer was directly measured by XPS analysis (QUANTUM MODEL 2000 manufactured by PHI, X-ray source: monochromated AlKα (1486.7 eV), X-ray output: 15 kV and 1.6 mA) and thereby controlled. In these Examples and Comparative Examples, the chromate treatment was applied only to one surface and when nickel strike plating was applied, the chromate treatment was performed as an upper layer of the nickel strike plating treatment.

The resin composition coated on a stainless steel foil is shown in Table 1. Resin (1) (86.9 mass %) shown in Table 1, 3 mass % of a polar group-containing vinyl polymer (C) (HIMILAN 1706, produced by Mitsui DuPont, K. K.), 10 mass % of a rubbery elastomer resin (D) (EBM2041P, produced by JSR Corp.), and 0.1 mass % of tetrakis[methylene(3,5-di-tert-butyl-4-hydroxyhydrocinnamate)]methane were dry blended using a V-type blender, and the resulting mixture was melt-kneaded at 260° C. by using a twin-screw kneading extruder TEX manufactured by Japan Steel Works, Ltd. to obtain a rein composition pellet. This was used as the polyester-based resin (E) of Resin (11) in Table 1. An ultrathin slice was cut out from the resin composition of Resin (11) by means of a microtome and then dyed with a ruthenium acid, and the dispersion state of the rubbery elastomer resin (D) and vinyl polymer (C) in Resin (11) was analyzed by a transmission electron microscope (TEM). As a result, in all cases, the rubbery elastomer resin (D) was almost 100% capsulated with the vinyl polymer (C), and the average dispersion diameter of the rubbery elastomer resin (D) was 1 µm or less, revealing fine dispersion in the matrix.

In a nitrogen stream, xylene was filled in a separable flask and thereto, a dry blend of Resin (3) in Table 1 and maleic anhydride at a ratio of 99.98:0.02 by mass was added. Xylene and maleic anhydride used each was a guaranteed reagent. The mixture was stirred at ordinary temperature for 30 minutes and the temperature was then elevated to 120° C. Subsequently, several drops of KAYAHEXA AD50C produced Kayaku AKZO Corp. dissolved in xylene were added and the mixture was further stirred for 4 hours. After cooling to 100° C., the resulting solution was poured in acetone, stirred, then filtered and dried to obtain a resin. The obtained resin was thoroughly extracted with acetone and unreacted maleic anhydride was removed. This resin is designated as Resin (5) in Table 1. Furthermore, resins were prepared in the same manner by changing the mass ratio of Resin (3) and maleic anhydride charged to 80:20 and 30:70 and designated as Resin (6) and Resin (7), respectively, in Table 1.

In Resins (4) to (7), the functional group having polarity is a maleic anhydride group and therefore, the content of the functional group was measured by neutralizing titration. As a result, the content was 0.01 mmol/g in Resin (4), 0.0002 mmol/g in Resin (5), 0.15 mmol/g in Resin (6), and 5.5 mmol/g in Resin (7).

Resin (4) in Table 1 in an amount of 99.995 or 95.45 mass % and montmorillonite (ESBEN NX, produced by HOJUN Co., Ltd.) as the layered inorganic material (B) in an amount of 0.005, 5 or 55 mass % were dry blended using a V-type blender, and this mixture was melt-kneaded using a twin-screw kneading extruder TEX manufactured by Japan Steel Works, Ltd. to obtain a rein composition pellet (kneading time: 6 minutes, kneading temperature: 245° C., average shear rate: 50/s). These were designated as Resin (9), Resin (10) and Resin (11) in Table 1. An ultrathin slice (50 nm in thickness) was produced using a microtome by $RuO_4$ stained ultramicrotomy and observed through a transmission electron microscope (TEM). In the matrix polymer, the layered inorganic material (B) was finely dispersed on the nanoscale of 50 to 300 nm.

TABLE 1

Raw Materials of Each Resin

| | Resin Species | Manufacturer |
|---|---|---|
| Resin (1) | polyester | MA1346 produced by Unitika Ltd. |
| Resin (2) | polyester | 1401-X04 produced by Toray Industries, Inc. |
| Resin (3) | polyolefin | NOVATEC PP EA7A produced by Japan Polypropylene Corp. |
| Resin (4) | polyolefin-based resin (A) | ADMER QE060 produced by Mitsui Chemicals, Inc. |
| Resin (5) | polyolefin-based resin (A) | kneaded in our own way |
| Resin (6) | polyolefin-based resin (A) | kneaded in our own way |
| Resin (7) | polyolefin-based resin (A) | kneaded in our own way |
| Resin (8) | polyolefin-based resin (A) where 0.005 mass % of layered inorganic material (B) was dispersed | kneaded in our own way |
| Resin (9) | polyolefin-based resin (A) where 5 mass % of layered inorganic material (B) was dispersed | kneaded in our own way |
| Resin (10) | polyolefin-based resin (A) where 55 mass % of layered inorganic material (B) was dispersed | kneaded in our own way |
| Resin (11) | polyester-based resin (E) | kneaded in our own way |

The resin was subjected to non-stretch shaping into a film form (width: 300 mm, thickness: 25 μm) by an extrusion molding machine equipped with a T-die at an extrusion temperature of 280° C. for Resins (1), (2) and (11) in Table 1 and 250° C. for other resins. Also, UNILON G-100 #25 produced by Idemitsu Unitech Co., Ltd. was used as a biaxially stretched polyamide film. Furthermore, Resins (3) and (4) were subjected to non-stretch shaping into a two-layer film form (width: 300 mm, Resin (3) layer: 15 μm, Resin (4) layer: 10 μm) by a co-extrusion molding machine equipped with a T-die at an extrusion temperature of 250° C. The obtained films were designated as Films (1) to (13), respectively, as shown in Table 2.

TABLE 2

Resin Used in Each Film

| | Resin Used |
|---|---|
| Film (1) | Resin (1) |
| Film (2) | Resin (2) |
| Film (3) | Resin (3) |
| Film (4) | Resin (4) |
| Film (5) | Resin (5) |
| Film (6) | Resin (6) |
| Film (7) | Resin (7) |
| Film (8) | Resin (8) |
| Film (9) | Resin (9) |
| Film (10) | Resin (10) |
| Film (11) | Resin (11) |
| Film (12) | co-extrusion of Resin (3) and Resin (4) |
| Film (13) | polyamide |

The film in Table 2 was thermocompression bonded to a stainless steel foil at 200° C. and 10 kg/cm$^2$ according to the combination shown in Table 3 (for the sake of convenience, the surface coated with the polyolefin-based resin (A) of the present invention is denoted as the front surface). In the case of using this stainless steel foil as a battery casing, the shaping was performed such that the polyolefin-based resin (A) side (front surface) and the other resin (for example, the polyester resin (E)) layer side (back surface) worked out to the battery casing inner surface and the battery casing outer surface, respectively. At the thermocompression bonding of Film (12), the thermocompression bonding was performed such that Resin (4) was brought into tight adherence to the stainless steel foil. In the case of Film (13), a urethane-based adhesive (ARON MIGHTY PU7000D, produced by Toagosei Co., Ltd.) was coated and the film was pressure-bonded to the stainless steel foil under curing conditions of 25° C. and 90 minutes. These are Examples 1 to 16 as shown in Table 3.

TABLE 3

Levels of Examples and Comparative Examples

| | Metal Foil | Polyolefin-Based Resin Layer | Thickness of Chromate Treatment Layer (nm) | With or Without Nickel Strike Plating | Adhesive | Surface |
|---|---|---|---|---|---|---|
| Example 1 | stainless steel | Film (4) none | 2.5 — | none — | none none | front back |
| Example 2 | stainless steel | Film (4) none | 10 — | none — | none none | front back |
| Example 3 | stainless steel | Film (4) none | 40 — | none — | none none | front back |
| Example 4 | stainless steel | Film (4) none | 100 — | none — | none none | front back |
| Example 5 | stainless steel | Film (4) none | 200 — | none — | none none | front back |
| Example 6 | stainless steel | Film (5) none | 10 — | none — | none none | front back |
| Example 7 | stainless steel | Film (6) none | 10 — | none — | used none | front back |
| Example 8 | stainless steel | Film (7) none | 10 — | none — | none none | front back |
| Example 9 | stainless steel | Film (4) none | 10 — | applied — | none none | front back |
| Example 10 | stainless steel | Film (12) Film (1) | 10 — | applied — | none none | front back |
| Example 11 | stainless steel | Film (12) Film (2) | 10 — | applied — | none none | front back |
| Example 12 | stainless steel | Film (12) Film (11) | 10 — | applied — | none none | front back |
| Example 13 | stainless steel | Film (12) Film (13) | 10 — | applied — | none used | front back |
| Example 14 | stainless steel | Film (8) Film (11) | 10 — | applied — | none none | front back |
| Example 15 | stainless steel | Film (9) Film (11) | 10 — | applied — | none none | front back |
| Example 16 | stainless steel | Film (10) Film (11) | 10 — | applied — | none none | front back |

TABLE 3-continued

Levels of Examples and Comparative Examples

| | Metal Foil | Poly-olefin-Based Resin Layer | Thickness of Chromate Treatment Layer (nm) | With or Without Nickel Strike Plating | Adhe-sive | Sur-face |
|---|---|---|---|---|---|---|
| Comparative Example 1 | stainless steel | Film (4) none | 1.5 — | none — | none none | front back |
| Comparative Example 2 | stainless steel | Film (4) none | 1.5 — | applied — | none none | front back |
| Comparative Example 3 | stainless steel | Film (4) none | 250 — | applied — | none none | front back |
| Comparative Example 4 | stainless steel | Film (3) none | 10 — | applied — | none none | front back |
| Comparative Example 5 | aluminum | Film (4) none | 10 — | none — | none none | front back |

Comparative Examples 1 to 6

Comparative Examples 1 to 5 were prepared in the same manner as in the Examples according to the combination shown in Table 3. The aluminum foil used in Comparative Example 5 was a pure Al-made foil of 100 μm in thickness.

The resin-coated stainless steel foils produced above were subjected to the following various tests.

(a) Primary Adherence Strength Test

The resin-coated metal foils of Examples 1 to 16 and Comparative Examples 1 to 5 each was cut out into a size of 10 mm×120 mm, and the adherence strength of the resin layer on the coated surface side was measured by a peel test (23° C., 180° peel: the same as JIS K6854-2 with tensile strength of 20 mm/min). The resin layer preferably has an adherence strength of 10 N/cm or more.

(b) Workability Evaluation Test

The resin-coated metal foils of Examples 1 to 16 and Comparative Examples 1 to 5 each was drawn into an angular cylindrical shape which is a shape often used for a battery casing. The pressing work at the angular cylindrical drawing was performed under the following conditions. The die size was 142 mm×142 mm with a corner part diameter of 4 mm, the punch size was 140 mm×140 mm with a corner part diameter of 4 mm, the wrinkle suppressing force was 9 ton, the lubricant was a 1:1 mixture of JOHNSON WAX 122 and castor oil, and a test material having a blank size of 200 mm×200 mm was pressed to a depth of 5 mm at a press speed of 60 mm/min by arranging the front surface side to the punch side.

The outer appearance of the resin-coated metal foil after pressing work was evaluated as follows, thereby effecting the evaluation of workability. The coated resin in all regions of the bent portion created by the angular cylindrical drawing work and the interface between the coated resin and the metal foil were observed by a magnifier at a magnification of 20 and examined for cracking or separation. The workability evaluation results were rated as follows: A: cracking and separation were not observed, B: cracking was not observed, C: fine cracking was observed, and D: cracking was observed. Ratings of B or higher were judged as passed.

(c) Corrosion Resistance Evaluation Test

Using the angular cylinder obtained in the workability evaluation test of (b), corrosion resistance of the inner surface of the angular cylinder (metal foil surface) in an electrolytic solution was evaluated as follows. A specimen in a size of 10 mm×120 mm was cut out from the bottom of each metal foil after angular cylindrical drawing work, completely dipped in an electrolytic solution in a glass-made bottle tightly closable by means of a stopper and kept at 75° C. for 1 week. Thereafter, the adherence strength was measured by a peel test in the same manner as in the primary adherence test, and the surface from which the resin was separated was observed by a magnifier at a magnification of 20 to confirm the presence or absence of corrosion. The electrolytic solution used was prepared by diluting lithium hexafluorophosphate ($LiPF_6$) to a concentration of 1 mol/L with a solvent which is a 1:1 mixture of ethylene carbonate and diethyl carbonate.

(d) Piecing Strength Test

The piecing strength was measured as follows. The resin-coated metal foil was fixed, a needle having a length of 50 mm, a diameter of 0.5 mm and a tip radius of 0.15 mm was vertically thrust into the front surface side and applied with a load, and the maximum load until the needle penetrated through was defined as the piecing strength. The strength required as a battery casing is preferably 1,200 g or more, more preferably 2,000 g or more.

TABLE 4

Evaluation Results of Examples and Comparative Examples

| | Primary Adherence Strength (front surface) (N/cm) | Evaluation of Workability | | Adherence Strength After Dipping in Electrolytic Solution (front surface) (N/cm) | Presence or Absence of Corrosion After Dipping in Electrolytic Solution (front surface) | Piecing Strength (g) |
|---|---|---|---|---|---|---|
| | | Front Surface | Back Surface | | | |
| Example 1 | 10.2 | A | — | 7.9 | none | 2250 |
| Example 2 | 10.5 | A | — | 9.5 | none | 2250 |
| Example 3 | 10.7 | A | — | 10.1 | none | 2250 |
| Example 4 | 10.5 | A | — | 9.6 | none | 2250 |
| Example 5 | 10.1 | A | — | 7.9 | none | 2250 |
| Example 6 | 10.0 | A | — | 7.6 | none | 2250 |
| Example 7 | 11.5 | A | — | 10.2 | none | 2250 |
| Example 8 | 10.2 | A | — | 8.1 | none | 2250 |
| Example 9 | 10.6 | A | — | 9.8 | none | 2250 |
| Example 10 | 10.1 | A | B | 9.2 | none | 2250 |
| Example 11 | 10.1 | A | B | 9.2 | none | 2250 |
| Example 12 | 10.1 | A | A | 9.2 | none | 2250 |

TABLE 4-continued

Evaluation Results of Examples and Comparative Examples

|  | Primary Adherence Strength (front surface) (N/cm) | Evaluation of Workability | | Adherence Strength After Dipping in Electrolytic Solution (front surface) (N/cm) | Presence or Absence of Corrosion After Dipping in Electrolytic Solution (front surface) | Piecing Strength (g) |
|---|---|---|---|---|---|---|
|  |  | Front Surface | Back Surface |  |  |  |
| Example 13 | 10.1 | A | B | 9.2 | none | 2250 |
| Example 14 | 12.3 | A | A | 11.0 | none | 2250 |
| Example 15 | 15.5 | A | A | 14.4 | none | 2250 |
| Example 16 | 9.5 | B | A | 7.8 | none | 2250 |
| Comparative Example 1 | 9.8 | A | — | 0.9 | observed | 2250 |
| Comparative Example 2 | 9.8 | A | — | 1.2 | observed | 2250 |
| Comparative Example 3 | 10.1 | D | — | 2.8 | observed | 2250 |
| Comparative Example 4 | 0.0 | D | — | 0.0 | observed | 2250 |
| Comparative Example 5 | 10.1 | A | — | 8.4 | none | 1055 |

The evaluation results are shown in Table 4. In all of Examples 1 to 16, good adherence force is maintained such that the percentage decrease in adherence force after dipping in the electrolytic solution from the primary adherence force is around 25% at a maximum, corrosion is not generated, and good workability is exhibited. In particular, when Examples 2 and 6 to 8 are compared, Examples 2 and 7 where the content of the functional group having polarity is from 0.001 to 3.0 mmol/g exert strong adherence force and are more preferred. Examples 12 and 14 to 16 are also more preferred, because the polyester-based resin (E) of the resin layer on the other surface has excellent printability and endows good design property. In addition, by coating the polyester-based resin (E) to act as a buffer material without allowing the stainless steel foil and the die to come into direct contact, workability is particularly enhanced and therefore, use of a lubricant at the shaping can be omitted. As a result, three steps of degreasing, coating of lubricating oil and removal of lubricating oil required before and after the working can be dispensed with and at the same time, abrasion of the mold which cannot be satisfactorily prevented even when using a lubricant can be suppressed and the life of the mold can be prolonged. Therefore, these Examples are more preferred. Example 15 is preferred, because the adherence force of the polyolefin-based resin (A) is particularly excellent and is not decreased very much even after dipping in the electrolytic solution and in turn, a battery casing with long durability can be produced. In particular, Examples 9 to 16 where a nickel strike plating treatment is applied are preferred, because the chromate treatment layer can be stably coated and a stainless steel foil having properties useful as a battery casing can be stably and continuously produced.

On the other hand, in Comparative Examples 1 and 2 where the thickness of the chromate treatment layer is 2 nm or less, the adherence force of the polyolefin-based resin (A) containing a functional group having polarity is utterly insufficient after dipping in the electrolytic solution and corrosion is generated. In Comparative Example 3 where the thickness of the chromate treatment layer is 200 nm or less, the adherence force of the polyolefin-based resin (A) containing a functional group having polarity is insufficient after dipping in the electrolytic solution and corrosion is generated. When the workability is evaluated, separation or cracking is observed at the interface between the coated film and the stainless steel foil. This occurs because cracking of the chromate treatment layer is generated in the bent portion created by the angular cylindrical drawing work and the chromate treatment layer is defective. In Comparative Example 4 where PP not containing a functional group having porality is used, the resin is not bonded at all to the stainless steel foil by thermocompression bonding. In Comparative Example 5 where an aluminum foil is used in place of a stainless steel foil, the piecing strength is greatly decreased as compared with the stainless steel foil.

As demonstrated above, it can be confirmed from the comparison of Examples 1 to 16 with Comparative Examples 1 to 5 that the stainless steel foil of the present invention is excellent in corrosion resistance, workability, design property and piercing resistance as compared with the conventional metal foil for a secondary battery container.

In the foregoing pages, preferred embodiments of the present invention are described by referring to the drawings attached, but the present invention is of course not limited to these examples. It will be apparent to one skilled in the art that various modifications and changes can be made without departing from the scope of the present invention as set forth in the claims, and all such modifications should be understood to be included in the technical scope of present invention.

INDUSTRIAL APPLICABILITY

The present invention is a resin-coated stainless steel foil excellent in the corrosion resistance, workability, design property and piecing resistance and is applicable to a container and a secondary battery.

The invention claimed is:

1. A resin-coated stainless steel foil having a chromate treatment layer of 5 to 60 nm in thickness on at least one surface of said stainless steel foil and having at least a polyolefin-based resin (A) layer containing a maleic anhydride group having polarity on said chromate treatment layer, wherein the content of said maleic anhydride group having polarity in said polyolefin-based resin (A) is from 0.0005 to 5 mmol/g, wherein the polyolefin-based resin (A) comprises 50 mass % or more of a resin having a repeating unit represented by the following formula (1) and contains the maleic anhydride group:

$$—CR^1H—CR^2R^3— \quad (1)$$

wherein $R^1$ and $R^2$ each independently represents an alkyl group having a carbon number of 1 to 12 or hydrogen, and $R^3$ represents an alkyl group having a carbon number of 1 to 12, an aryl group, or hydrogen.

2. The resin-coated stainless steel foil as claimed in claim 1, wherein said chromate treatment layer has a thickness of 8 to 40 nm.

3. The resin-coated stainless steel foil as claimed in claim 1, wherein said stainless steel foil has a thickness of 10 to 200 μm and said polyolefin-based resin (A) layer has a thickness of 0.5 to 200 μm.

4. The resin-coated stainless steel foil as claimed in claim 1, wherein the content of said maleic anhydride group having polarity in said polyolefin-based resin (A) is from 0.001 to 1.0 mmol/g.

5. The resin-coated stainless steel foil as claimed in claim 1, wherein the content of said maleic anhydride group having polarity in said polyolefin-based resin (A) is from 0.0006 to 4.9 mmol/g.

6. The resin-coated stainless steel foil as claimed in claim 1, having the chromate treatment layer of 5 to 60 nm on one surface of said stainless steel foil, having at least the polyolefin-based resin (A) layer containing the maleic anhydride group having polarity on said chromate treatment layer, and having a resin layer on the other surface of said stainless steel foil.

7. The resin-coated stainless steel foil as claimed in claim 6, wherein the resin layer on the other surface of said stainless steel foil is at least one resin layer composed of a resin composition comprising, as the main component, one member or two or more members selected from the group consisting of a polyolefin, a polyester, a polyamide and a polyimide.

8. The resin-coated stainless steel foil as claimed in claim 6, wherein the resin layer on the other surface of said stainless steel foil is at least one resin layer composed of a polyester-based resin (E) having finely dispersed therein a rubbery elastomer resin (D) capsulated with a vinyl polymer (C) containing a polar group.

9. The resin-coated stainless steel foil as claimed in claim 6, which has a surface preparation treatment layer between the resin layer on the other surface of said stainless steel foil and said stainless steel foil.

10. The resin-coated stainless steel foil as claimed in claim 9, wherein said surface preparation treatment layer is one layer or two or more layers selected from the group consisting of a chromate treatment layer, a chemical conversion layer and an adhesive layer.

11. The resin-coated stainless steel foil as claimed in claim 1, wherein from 0.01 to 50 mass % of a layered inorganic material (B) is dispersed in said polyolefin-based resin (A).

12. The resin-coated stainless steel foil as claimed in claim 11, wherein the longest diameter of said layered inorganic material (B) is 1 μm or less.

13. The resin-coated stainless steel foil as claimed in claim 11, wherein said layered inorganic material (B) is montmorillonite.

14. The resin-coated stainless steel foil as claimed in claim 1, which has a strike plating layer between said chromate treatment layer and said stainless steel foil.

15. The resin-coated stainless steel foil as claimed in claim 14, wherein the plating species of said strike plating is nickel.

16. A container obtained by shape-forming the resin-coated stainless steel foil claimed in claim 1.

17. A secondary battery comprising the container of claim 16.

* * * * *